United States Patent [19]

Yoshitsugu

[11] Patent Number: 4,560,187
[45] Date of Patent: Dec. 24, 1985

[54] GUIDE RAIL FOR AUTOMATIC SEAT BELT
[75] Inventor: Noritada Yoshitsugu, Toyota, Japan
[73] Assignee: Toyota Jidosha Kabushiki Kaisha, Aichi, Japan
[21] Appl. No.: 558,587
[22] Filed: Dec. 6, 1983
[30] Foreign Application Priority Data
  Feb. 22, 1983 [JP] Japan .............................. 58-24601[U]
[51] Int. Cl.$^4$ ............................................. B60R 21/00
[52] U.S. Cl. ................................................... 280/804
[58] Field of Search ................................ 280/804, 802
[56] References Cited
  U.S. PATENT DOCUMENTS
  4,302,631 11/1981 Nishimura et al. .................. 280/804
  4,343,489  8/1982 Suzuki et al. ....................... 280/804
  4,345,781  8/1982 Suzuki et al. ....................... 280/802
  4,354,695 10/1982 Sato ..................................... 280/804

Primary Examiner—Joseph F. Peters, Jr.
Assistant Examiner—Kenneth R. Rice
Attorney, Agent, or Firm—Parkhurst & Oliff

[57] ABSTRACT

A guide rail unit for an automatic seat belt which comprises a guide rail body formed in a rectangular shape, a slider connected to the side end of the seat belt inserted into the guide rail body with a body, a head and a slider drive tape slidably inserted thereto, the guide rail body being formed with an opening for guiding said slider along the longitudinal direction of the body and formed sequentially with a guide groove of the slider drive tape, a guide groove of the slider body and a guide groove of the slider head from the opening side therein, an anchor bracket of thin plate secured to the guide rail body around the guide rail body, and the anchor bracket being formed with a mounting hole for mounting the said bracket to the pillars at the position in the vicinity of the rail body. Thus, the guide rail unit can be mounted in the narrow pillar part.

16 Claims, 9 Drawing Figures

GUIDE RAIL FOR AUTOMATIC SEAT BELT

BACKGROUND OF THE INVENTION

The present invention relates to improvements in a guide rail unit for an automatic seat belt mounted at a front seat for a vehicle.

In an existing automatic seat belt unit mounted at a front seat for a vehicle, the outer side end of a seat belt is led from the top of a center pillar through a roof side rail to the top of a front pillar upon opening of an automotive door, the seat belt is disposed to an occupant non-restricting position, the outer side end is guided from the top of the front pillar again through the roof side rail to the top of the center pillar upon closing of the door, and the seat belt is disposed to an occupant restricting position.

In the above-described automatic seat belt unit, the guide rail of the seat belt is arranged while the seat belt is moved from the top of the center pillar through the roof side rail to the top of the front pillar. The conventional guide rail is variously constructed as shown in FIGS. 5 to 9.

More particularly, in the automatic seat belt represented by FIG. 5, a guide shoe 4 is bonded on the inner surface of the guide groove 3 of a seat belt slider 2 in the rail body 1 of a guide rail. Thus, the rail body 1 should be increased in size, and the bracket is also increased in size. When this seat belt is mounted at a center or front pillar of narrow width, it has such a disadvantage that the external appearance is obviated since the seat belt is not contained in the narrow width of the pillar. Further, due to the length l of the guide rail 1, when the guide rail 1 is bent at the transition from the center or front pillars to the roof side rail, the sectional shape of the guide rail 1 is collapsed, and the seat belt slider 2 cannot advantageously slide smoothly.

In the automatic seat belt represented by FIG. 6, the rail body 5 of the guide rail is increased in size in the same manner as that shown in FIG. 5 because the guide arm 7 of the seat belt slider 6 and a guide groove 9 of a slide roller 8 are formed, and this also has the similar disadvantage to that in FIG. 5.

In the automatic seat belt represented by FIG. 7, a mounting flange 12 is integrally extended from the rail body 11 formed with the guide groove 10 of the seat belt slider in the guide rail structure. Thus, the size l is increased, and this also has the similar disadvantage to that in FIG. 5.

In the automatic seat belt represented by FIG. 8, the rail body 13 is interposed between anchor brackets 14 and 15, and mounting holes 18 and 19 are opened at the mounting flanges 16 and 17 which are extended from the anchor brackets 14 and 15, respectively. In this manner, the size l is similarly increased as the above examples, and similar disadvantage is contained to that in FIG. 5.

In the seat belt illustrated in FIG. 9, the guide rail is split into a slide rail 21 secured to a roof side rail 20 and a guide rail 22 secured to a slide rail 21, the slide rollers 24, 25 of the seat belt slider 23 are rolled on the slide rail 21, and the seat belt slider 23 is slidably reciprocated by the slider drive tape 26 by the guide rail 22. Thus, the size l is similarly increased, similar disadvantage to that in FIG. 5 is incorporated, and the structure is further complicated making expense another of its drawbacks.

SUMMARY OF THE INVENTION

Accordingly, an object of the present invention is to provide an improved guide rail unit for an automatic seat belt, which can be reduced in size, mounted in a narrow pillar portion, not collapsed in section even by bending and smoothly slided at a seat belt slider by forming only guide grooves for a head and a body of a seat belt slide and for a slider drive tape, securing an anchor bracket of reduced thickness around the rail body and opening the mount hole at the position near the rail body of the bracket to the pillars.

These and other objects and features will become more apparent from the following description of the preferred embodiments of the present invention when read in connection with the accompanying drawings.

DESCRIPTION OF THE PREFERRED EMBODIMENTS

The present invention will now be described in more detail with reference to the accompanying drawings.

Figure 1:
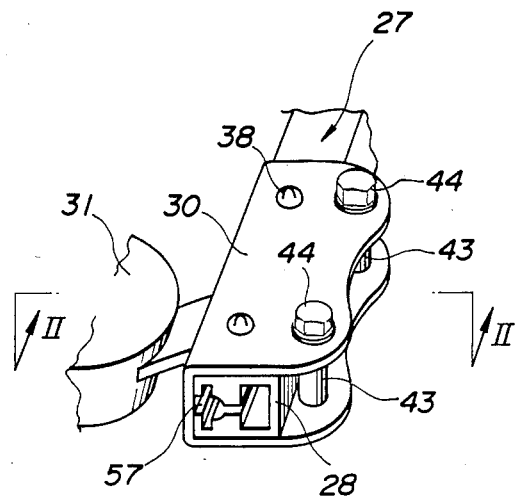
FIG. 1 is a perspective view of the essential part of a first embodiment of a guide rail unit for an automatic seat belt according to the present invention.
Figure 2:
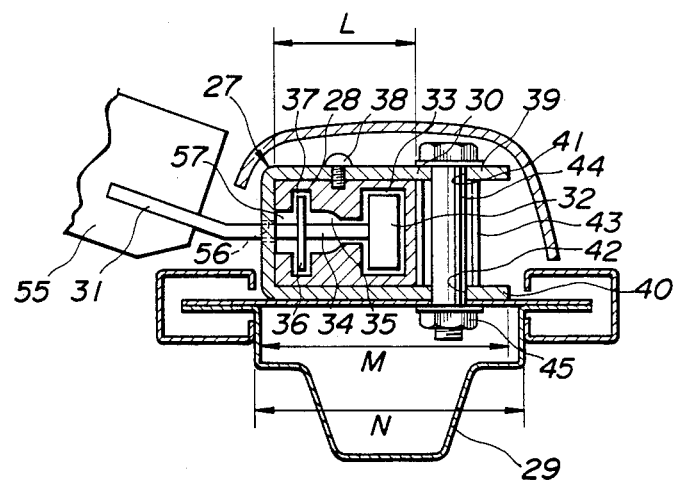
FIG. 2 is a sectional view showing the mounting state of the guide rail to pillars taken along the line II—II in FIG. 1.

FIGS. 1 and 2 show an embodiment of a guide rail for an automatic seat belt according to the present invention. A guide rail 27 for an automatic seat belt is composed of a rail body 28 of rectangular section, and an anchor bracket 30 for fixing the rail body 28 to pillars 29 such as a center pillar and a front pillar.

Only guide grooves such as a guide groove 33 for sliding a head 32 of a seat belt slider 31 which is connected to the side end of a seat belt through an anchor 55, a guide groove 35 for sliding a body 34 of the slider 31, and a guide groove 37 for sliding a slider drive tape 36 are formed through the rail body 28 of rectangular section longitudinally of the rail body. As can be seen in FIG. 2, such guide grooves form an H-shape in cross-section. An opening 57 is formed at the rail body to guide the slider along the longitudinal direction of the rail body.

The anchor bracket 30 which is made of a thin plate is secured to the mount of the rail body 28 to the pillars 29 around the rail body 28. A slit 56 is formed at the anchor bracket 30 corresponding to the opening 57.

In the embodiment shown in FIGS. 1 and 2, mounting holes 41 and 42 are opened at the mounting flanges 39 and 40 which are extended from the anchor bracket 30 at the position in the vicinity of the rail body 28, and a mounting bolt 44 and a nut 45 are clamped through a space sleeve 43 to the pillars 29.

According to the guide rail thus constructed as above, the lateral width size L of the rail body 28 can be remarkably reduced, and the entire lateral width M of the guide rail 27 including the anchor bracket 30 can also be reduced. Thus, the lateral width M can be decreased as compared with the lateral size N of the pillars 29.

Further, the lateral size L of the rail body 28 of rectangular section can be reduced, and the sectional shape of the rail body 28 cannot be collapsed when the rail body 28 is bent.

Figure 3:
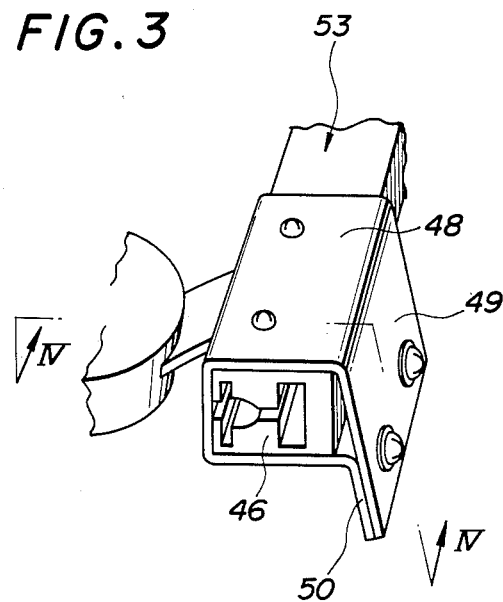
FIG. 3 is a perspective view of the essential part of a second embodiment of the invention.
Figure 4:
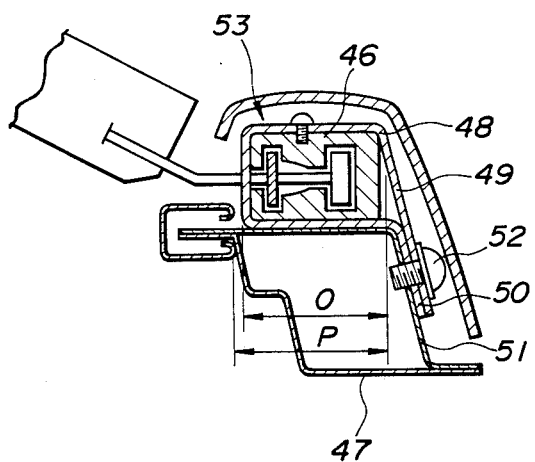
FIG. 4 is a sectional view showing the mounting state of the guide rail to pillars at the position taken along the line IV—IV in FIG. 3.
Figure 5:
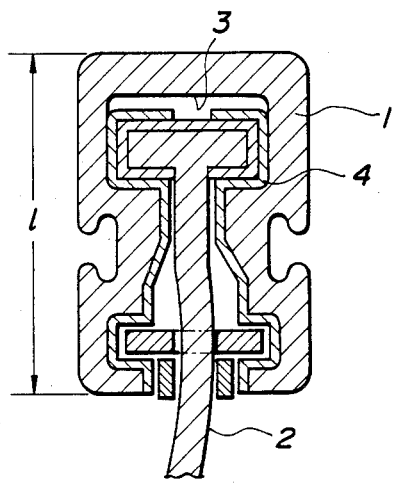
FIG. 5 is an enlarged sectional view of an example of a conventional guide rail.
Figure 6:
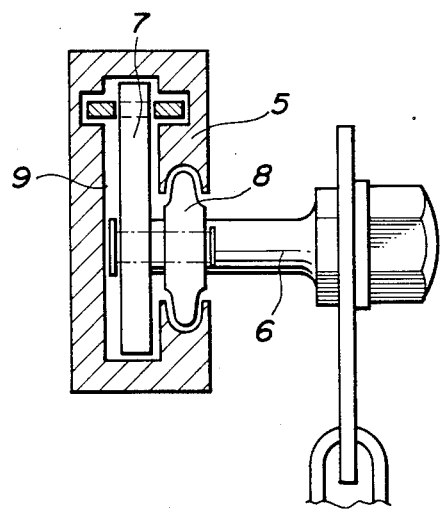
FIG. 6 is an enlarged sectional view of another example of a conventional guide rail.
Figure 7:
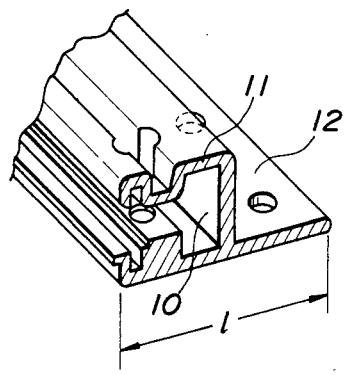
FIG. 7 is a perspective view of still another example of a conventional guide rail.
Figure 8:
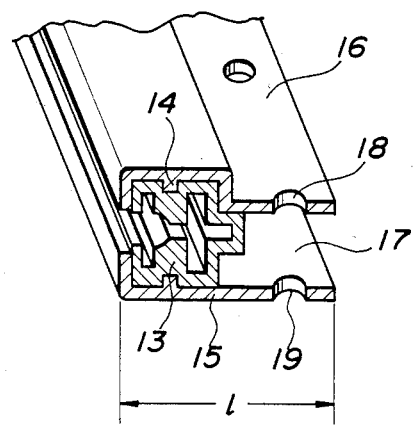
FIG. 8 is a perspective view of still another example of a conventional guide rail.
Figure 9:
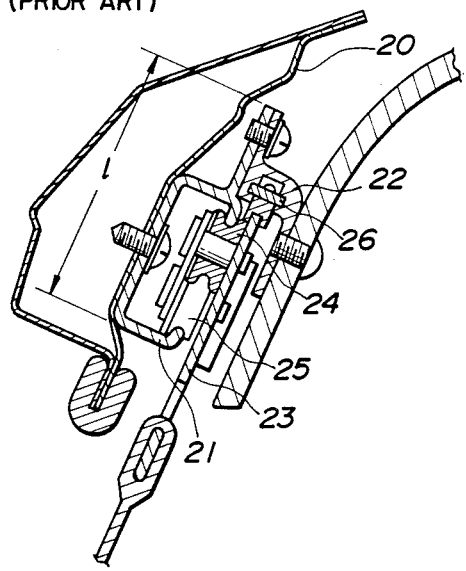
FIG. 9 is a sectional view showing the mounting state of still another example of a conventional guide rail.

FIGS. 3 and 4 show another embodiment of the guide rail of the invention, in which the structure of the anchor bracket 48 for fixing the rail body 46 having the same structure as the rail body 28 of the embodiment in FIGS. 1 and 2 to the pillars 47 is modified. Mounting flanges 49 and 50 of the bracket 48 are bent sidewisely in double folds, and fixed by screws 52 to the side faces 51 of the pillars 47. Thus, the entire lateral size O of the guide rail 53 including the anchor bracket 48 can be remarkably reduced in length, and the seat belt can be secured to the pillars 47 which have the lateral size P significantly reduced and are adapted for a two-door compact car.

As described hereinbefore, the guide rail unit for the automatic seat belt according to the present invention is constructed to have a rail body in a rectangular section in which the guide grooves of the head and body of the seat belt slider are formed, and the lateral size of the section of the rail body can be reduced as small as possible.

In the rail body of the guide rail, the anchor bracket of reduced thickness is fixed, and mounting holes to the pillars are opened at the position in the vicinity of the rail body of the bracket. In this manner, the lateral size in the section of the guide rail including the anchor bracket can be reduced as small as possible.

As a result, the guide rail can be mounted even in the narrow pillars, thereby improving the external appearance.

Since the lateral size of the rail body in section in thus reduced in size, the rail body can also be reduced in size, cannot deform nor collapse in sectional shape even if bent, and the seat belt slider can be always smoothly slided.

What is claimed is:

1. A guide rail unit for an automatic seat belt comprising:
   a guide rail body formed in a rectangular sectional shape;
   a slider connected to the side end of the seat belt inserted into said guide rail body with a body, a head and a slider drive tape slidably inserted into the guide rail body;
   said guide rail body being formed with an opening for guiding said slider along the longitudinal direction of said body, said opening being formed sequentially from the opening side thereof, with a guide groove for the slider drive tape, a guide groove for the slider body and a guide groove for the slider head;
   a thin anchor bracket secured to said guide rail body around only the end of said guide rail body;
   said anchor bracket being formed with an opening opposite to the opening of said guide rail body for guiding the slider, and with a mounting hole at a position in the vicinity of said guide rail body;
   said guide rail body being mounted at the end thereof through the anchor bracket to a pillar.

2. The guide rail unit according to claim 1, wherein the groove shape of said guide rail body is substantially H shape in section.

3. The guide rail unit according to claim 1, wherein said anchor bracket is formed substantially in U shape.

4. The guide rail unit according to claim 1, wherein said anchor bracket is secured via a bolt through said mounting hole to the pillar.

5. The guide rail unit according to claim 1, wherein the lateral size of said anchor bracket is shorter than the lateral size of the pillar.

6. The guide rail unit according to claim 5, wherein said anchor bracket has upper and lower flanges which are bent sidewisely in two folds, and said anchor bracket is secured to the side face of the pillar at the bent part.

7. The guide rail unit according to claim 1, wherein said anchor bracket has upper and lower flanges which are bent sidewisely in two folds.

8. The guide rail unit according to claim 7, wherein said anchor bracket is secured to the side face of the pillar at the bent part.

9. A guide rail unit for an automatic seat belt comprising:
   a guide rail body formed in a rectangular sectional shape;
   a slider connected to the side end of the seat belt inserted into said guide rail body with a body, a head and a slider drive tape slidably inserted into the guide rail body;
   said guide rail body being formed with an opening for guiding said slider along the longitudinal direction of said body, said opening being formed sequentially from the opening side thereof, with a guide groove for the slider drive tape, a guide groove for the slider body and a guide groove for the slider head;
   a thin anchor bracket secured to said guide rail body around only the end of said guide rail body;
   said anchor bracket being formed with an opening opposite to the opening of said guide rail body at a forward side from the center at a position isolated from the end of said anchor bracket for guiding the slider, and with a mounting hole at a position in the vicinity of said guide rail body;
   said guide rail body being mounted at the end thereof through the anchor bracket to a pillar.

10. The guide rail unit according to claim 9, wherein the groove shape of said guide rail body is substantially H shape in section.

11. The guide rail unit according to claim 9, wherein said anchor bracket is formed substantially in U shape.

12. The guide rail unit according to claim 9, wherein said anchor bracket is secured via a bolt through said mounting hole to the pillar.

13. The guide rail unit according to claim 9, wherein the lateral size of said anchor bracket is shorter than the lateral size of the pillar.

14. The guide rail unit according to claim 13, wherein said anchor bracket has upper and lower flanges which are bent sidewisely in two folds, and said anchor bracket is secured to the side face of the pillar at the bent part.

15. The guide rail unit according to claim 9, wherein said anchor bracket has upper and lower flanges which are bent sidewisely in two folds.

16. The guide rail unit according to claim 15, wherein said anchor bracket is secured to the side face of the pillar at the bent part.

* * * * *